3,393,084
COATING CARBON SUBSTRATES WITH
REFRACTORY METAL CARBIDES
Jurgen Hartwig, Fostoria, Ohio, assignor to Union Carbide
Corporation, a corporation of New York
No Drawing. Filed May 1, 1964, Ser. No. 364,302
1 Claim. (Cl. 117—16)

The present invention relates to a process for coating carbon substrates. More particularly, the present invention relates to a process for providing carbon substrates with an adherent coating of refractory metal carbide.

Carbon, which in the present disclosure also includes graphitic material, has various properties which make it an excellent material for high temperature applications. These properties include good thermal shock resistance, a high sublimation point, and increasing strength with increasing temperature (up to 2200° C.)

However, the use of carbon as a refractory is limited by its affinity for oxygen, relatively poor erosion resistance and relatively high permeability.

Various attempts have been made to overcome these shortcoming, the most satisfactory of which involve the admixture with carbon of materials which form glassy oxides or the direct coating of carbon substrates with refractory carbides.

The admixture approach, however, has not been entirely successful since the high temperature properties of carbon are adversely affected by admixed oxide formers.

The direct coating technique, while not disadvantageously affecting the properties of the carbon substrate, has failed to provide a strongly adhering refractory metal carbide coating of columbium, titanium, tantalum, zirconium or hafnium.

It has been found that adherent coatings are not formed by direct coating techniques because, when in contact with Cb, Ti, Ta, Zr, and Hf, at high temperatures, carbon has a higher rate of diffusion than these metals. Thus, when a carbon article is placed in an intimate contact relationship with one of these refractory metals, carbon atoms will diffuse from the article and form the carbide on the metal side of the interface rather than on and through the surface of the carbon article. This results in a coating with poor adherence.

It is therefore an object of the present invention to provide a process for producing strongly adhering refractory metal carbide coatings on carbon substrates.

It is another object of the present invention to provide a refractory metal carbide coated carbon article which is suitable for use at elevated temperatures.

Other objects will be apparent from the following description and claims.

A process in accordance with the present invention comprises initially providing a carbon substrate with a coating of silicon carbide and contacting the silicon carbide coated carbon substrate with a metal selected from the group consisting of Hf, Ti, Zr, Ta and Cb at a temperature sufficient to cause reaction of the selected metal and the silicon carbide coating and the formation of a carbide of the selected metal.

In a particular embodiment of the present invention, carbon or graphite articles such as rods or tubes formed of ATJ grade graphite, CS–312 grade graphite or electrographitic thermatomic carbon are dipped in a bath of molten silicon-refractory metal alloy, e.g. an alloy of silicon with at least one metal selected from the group consisting of Hf, Ti, Zr, Ta and Cb. The proportion of silicon in the alloy is predominant, for example a 70–30 (atomic weight percent) Si-Hf alloy can be suitably employed. With such a molten alloy bath, the ensuing reaction of the carbon article with the alloy results initially, in the formation of a predominantly silicon carbide reaction product which forms at the surface of the carbon article and also penetrates into the carbon substrate to provide a strongly adhering bond. The preferential formation of the silicon carbide coating and the penetration thereof into the carbon substrate is due to the greater concentration of silicon in the alloy and hence at the alloy-carbon interface.

While the carbon substrate is still immersed in the alloy bath, a further reaction takes place between the refractory metal in the alloy bath and the aforedescribed silicon carbide reaction product which is in the solid state. In this reaction, because of its greater affinity for carbon (higher free energy of carbide formation), the refractory metal replaces silicon in the silicon carbide by a diffusion mechanism and results in the formation of a solid surface layer which is predominantly refractory metal carbide.

When the refractory metal carbide layer is formed, reaction with the molten alloy ceases and the carbon article is removed from the bath.

The carbon article thus treated is found to have a strongly adhering coating which at its outer surface is predominantly, i.e. more than about 90% by weight refractory metal carbide, and which, in an intermediate zone, below the surface and in the vicinity of the original carbon surface, contains some unconverted silicon carbide with possibly a minor proportion of refractory metal silicide.

By virtue of the aforedescribed coating process, a coated article is obtained in which the coating is strongly bonded to the carbon substrate by virtue of the initial penetrating silicon carbide material and which is highly oxidation and corrosion resistant due to the surface refractory metal carbide layer formed by the reaction of refractory metal with the silicon carbide.

This article by virtue of the fact that the coating is bonded to the carbon substrate by a penetrating layer of carbide is not subject to the flaking at high temperatures which is characteristic of refractory metal carbide coatings which are produced by previously known direct bonding techniques.

In the practice of the present invention, the carbon substrates to be treated can include materials ranging from highly graphitic types to low temperature (1000° C.–1400° C.) baked carbonaceous articles.

The alloy bath in which the substrate is dipped contains at least 70% (atomic weight percent) silicon with the balance being refractory metal. At least 70% silicon is required in the alloy bath in order that silicon carbide will be the major constituent of the initial reaction product which results when the carbon substrate is contacted by the molten metal and so that a penetrating silicon carbide layer is initially provided. The maximum amount of silicon in the molten bath should not be more than about 95% since greater amounts either tend to retard the formation of a suitable refractory carbide layer or require an unduly long time for the formation of a satisfactory refractory metal carbide coating. Also, the proportion of refractory metal in the bath should not exceed about 30% (atomic weight percent) since greater amounts have the effect of preventing a suitable initial penetration of the silicon carbide into the carbon substrate which feature is essential to the ultimate production of a strongly adherent carbide coating. This effect of limiting silicon carbide penetration which occurs when larger amounts of refractory metal are employed, is due to the premature formation of refractory metal carbide which stops further reaction of the carbon substrate and metal bath.

The temperature of the molten alloy bath is, in general, not critical and a suitable temperature range is is from 1700–2200° C. Temperatures in the higher portion of the range are generally preferred because of increased reaction rate especially as regards the conversion of silicon carbide to refractory metal carbide.

With regard to the time of immersion of the substrate in the molten alloy bath, it has been found that with highly graphitic spectrographic carbon electrodes (6 mm. diameter; 1.4 g./cc. sp. gravity), using an 80–20 (atomic weight percent) Si-Hf alloy at a temperature of about 2000° C. an immersion time of 10 minutes provided a predominantly hafnium carbide coating of 2 mm. total penetration. The outer layer of the carbide coating was essentially continuous, i.e. coherent and contained more than 90% by weight hafnium carbide. This outer coherent layer was about 0.3–0.4 mm. in depth.

In a further example, using a CS–112 grade fine grain graphite tube (10 mm. O.D., 7 mm. I.D.) and a 75–25 (atomic weight percent) Si-Hf alloy at a temperature of about 2100° C., an immersion time of 10 minutes provided a predominantly hafnium carbide coating of about 0.2 mm. total penetration.

The outer layer of the carbide coating was essentially continuous, i.e. coherent and contained more than 90% by weight hafnium carbide. This outer coherent layer was at least about 0.1 mm. in depth.

In a further embodiment of the present invention, a carbon substrate is first provided with a penetrating silicon carbide coating using a method such as disclosed in applicant's U.S. Patent 3,095,316 or other known methods.

Following the method of the patent, the carbon article to be coated is brought into intimate contact with a mixture of carbide carrier material and a source of silicon, heated to between 1500–2200° C. for the time necessary to form a silicon carbide coating, and slowly cooled. The carbide carrier material can be silicon carbide, titanium carbide, zirconium carbide, hafnium carbide or tantalum carbide or mixtures thereof. The silicon source can be powdered silicon and/or silicon oxide.

The silicon carbide coated carbon substrate obtained in the foregoing manner is then further processed using a pack technique wherein a powdered mixture of refractory metal, (Hf, Ti, Zr, Ta, Cb), and refractory metal carbide carrier material (titanium carbide, zirconium carbide, hafnium carbide and tantalum carbide) is used as the pack and heating is conducted in the range of 1500° C. to 2200° C. A suitable sizing for the pack mixture is 325 mesh x D (U.S. Series). Such a mixture, for example, would be 90% by weight carrier material and 10% by weight refractory metal, e.g. 90% TiC and 10% Ti metal, and with such a mixture, heating at 2200° C. for about 5 hours provides a highly satisfactory metal carbide coating.

In this latter embodiment, refractory metal replaces the silicon of the initial silicon carbide coating and forms a penetrating, predominantly refractory metal carbide coating.

In contrast, previous attempts to provide adherent refractory metal coatings directly on carbon articles using a pack of refractory metal and carrier material were unsuccessful since under these circumstances carbon diffuses faster than the refractory metal and a coating is formed on the pack material instead of the substrate. In all embodiments of the present invention, however, the carbon surface is initially "blocked" by the formation of silicon carbide and a refractory metal carbide coating is then provided by conversion of the silicon carbide to refractory metal carbide.

The coated carbon articles obtained in the practice of the present invention as aforedescribed are characterized by strongly adherent coatings that give excellent service at elevated temperatures at which temperatures previously known refractory metal carbide coatings experienced failures.

What is claimed is:
1. A process for providing carbon substrates with an adherent coating predominantly in the form of a carbide selected from the group consisting of hafnium carbide, tantalum carbide, titanium carbide, zirconium carbide and columbium carbide, said process comprising
   (1) intimately contacting a carbon substrate with a mixture of carbide carrier material and a source of silicon said carbide carrier material being selected from the group consisting of silicon carbide, titanium carbide, zirconium carbide, hafnium carbide and tantalum carbide and said source of silicon being selected from the group consisting of silicon and silicon oxide
   (2) heating the mixture and substrate to an elevated temperature to provide the substrate with a coating of silicon carbide
   (3) removing the silicon carbide coated carbon substrate thus obtained from the aforementioned mixture and intimately contacting said substrate with a second mixture of carbide carrier material with a metal selected from the group consisting of Hf, Ti, Zr, Ta and Cb, said carbide carrier material in said second mixture being selected from the group consisting of titanium carbide, zirconium carbide, hafnium carbide and tantalum carbide and
   (4) heating the last mentioned mixture and silicon carbide coated carbon substrate to an elevated temperature to cause reaction of the selected metal and the silicon carbide coating and the formation of carbide of the selected metal.

References Cited

UNITED STATES PATENTS

| | | | |
|---|---|---|---|
| 2,548,897 | 4/1951 | Kroll | 164—61 |
| 2,636,856 | 4/1953 | Suggs et al. | 117—228 X |
| 2,991,192 | 7/1961 | Halden et al. | 117—22 |
| 3,028,256 | 4/1962 | Simnad | 117—118 X |
| 3,095,316 | 6/1963 | Hartwig | 117—16 |
| 3,208,870 | 9/1965 | Criss | 117—118 X |
| 3,265,528 | 8/1966 | Bond | 117—118 X |

FOREIGN PATENTS 680,237   2/1964   Canada.

ALFRED L. LEAVITT, *Primary Examiner.*

J. R. BATTEN, JR., *Assistant Examiner.*